US012431108B1

(12) United States Patent
Wang et al.

(10) Patent No.: US 12,431,108 B1
(45) Date of Patent: Sep. 30, 2025

(54) DISPLAY MAPPING METHODOLOGY

(71) Applicant: Toshiba Global Commerce Solutions, Inc., Durham, NC (US)

(72) Inventors: Chi-Huang Wang, Taipei (TW); Wei-Yi Hsuan, Taipei (TW); Yi-Sheng Lee, Taipei (TW); Te Chia Tsai, Taipei (TW)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/616,684

(22) Filed: Mar. 26, 2024

(51) Int. Cl.
*G09G 5/10* (2006.01)
*G06F 3/14* (2006.01)
*G06T 5/40* (2006.01)
*G06T 7/90* (2017.01)

(52) U.S. Cl.
CPC .............. *G09G 5/10* (2013.01); *G06F 3/1423* (2013.01); *G06T 5/40* (2013.01); *G06T 7/90* (2017.01); *G06T 2207/10024* (2013.01); *G06T 2207/20132* (2013.01); *G09G 2320/0626* (2013.01)

(58) Field of Classification Search
CPC  G09G 5/10; G09G 2320/0626; G06F 3/1423; G06T 5/40; G06T 7/90; G06T 2207/10024; G06T 2207/20132
See application file for complete search history.

(56) References Cited

U.S. PATENT DOCUMENTS

| 9,134,950 | B2 | 9/2015 | Choi | |
|---|---|---|---|---|
| 9,354,840 | B2 | 5/2016 | Seo | |
| 9,911,176 | B2 | 3/2018 | Griffin | |
| 10,318,129 | B2 | 6/2019 | Inagaki | |
| 2009/0122132 | A1* | 5/2009 | Thielman | H04N 17/02 348/E7.083 |
| 2015/0279037 | A1 | 10/2015 | Griffin | |
| 2021/0149441 | A1* | 5/2021 | Bartscherer | G06F 1/1616 |
| 2023/0179868 | A1* | 6/2023 | Nikhara | H04N 23/665 345/633 |
| 2023/0205477 | A1* | 6/2023 | Johnson | G06F 3/0346 345/173 |

FOREIGN PATENT DOCUMENTS

| EP | 2328073 | 6/2011 |
|---|---|---|
| WO | 2015031426 | 3/2015 |

* cited by examiner

*Primary Examiner* — Amit Chatly

(74) *Attorney, Agent, or Firm* — Kaufman & Canoles, P.C.

(57) ABSTRACT

Systems and methods of display mapping methodology are performed. In one embodiment, a method is performed by a controller coupled to a set of displays and a set of optical sensors, with each display being operable to display an image, with the display of that image enabling illumination of a region before that display. Each optical sensor has a field of view that includes the region before a corresponding display and is operable to capture an image. The method includes sending, to a target display, an indication that includes image data that represents a certain image to enable illumination of the region before the target display with a representation of the certain image so that the controller is operable to associate which of the optical sensors corresponds to the target display based on the image captured by at least one of the optical sensors and the certain image.

18 Claims, 5 Drawing Sheets

DISPLAY MAPPING METHODOLOGY

BACKGROUND

In retail stores, customers typically purchase merchandise at checkout stations. Cashier-assisted checkout stations or self-checkout stations are commonly used for making such purchases and can include multiple displays. For instance, a cashier-assisted checkout station can include a display facing the cashier to enable the cashier to verify scanned merchandise and another display facing the customer to enable the customer to review the scanned merchandise prior to purchasing. While the use of multiple displays at checkout stations improves checkout efficiency, the installation of these stations is more complex as the multiple displays require configuration and calibration, which typically requires an installer to manually install, calibrate and configure such components for each checkout station.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
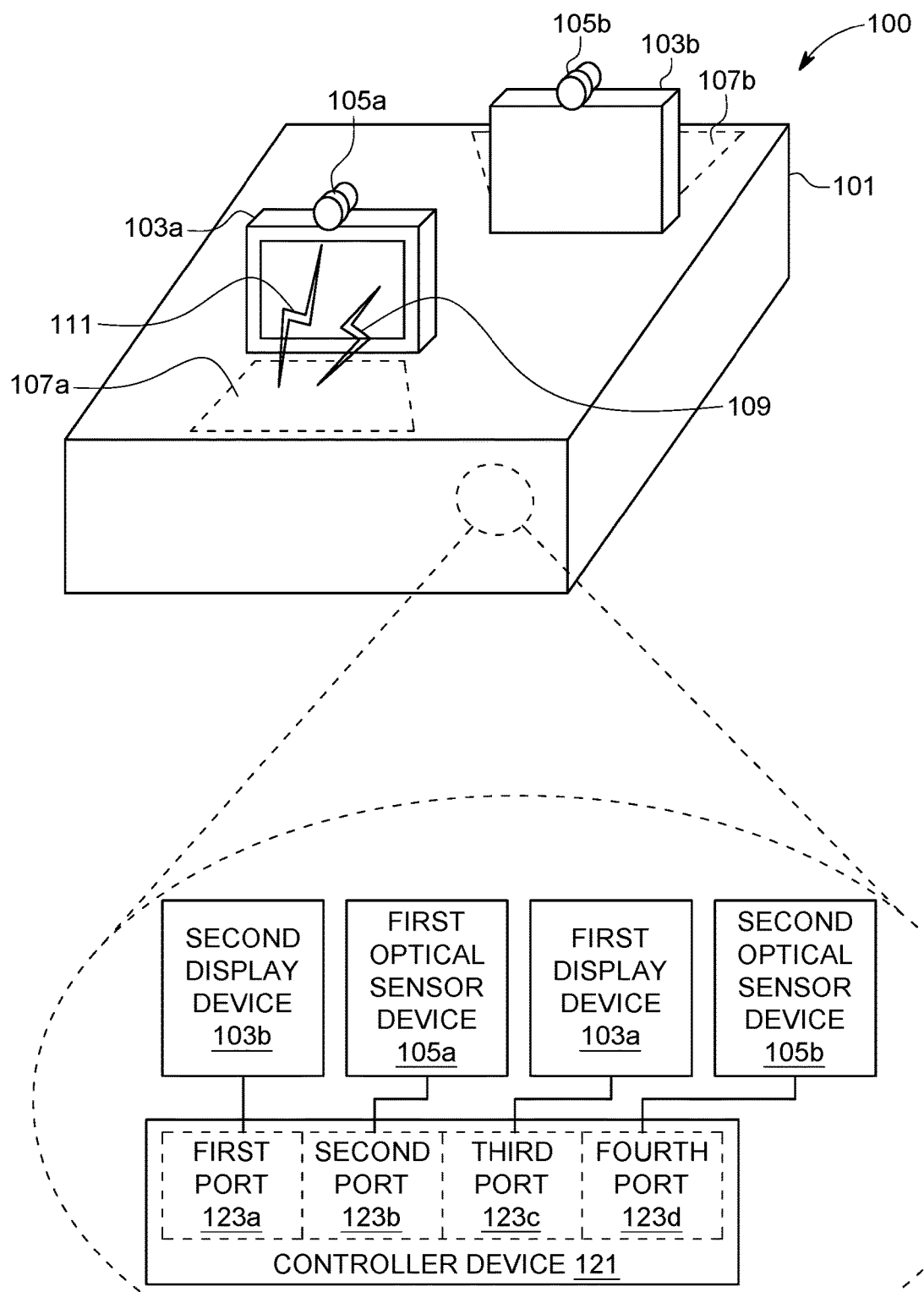
FIG. 1 illustrates one embodiment of a system associated with a display mapping methodology in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Display mapping methodologies provide techniques and mechanisms for determining the mapping of displays to other functional units associated with those displays. For example, in a point of sale (POS) system (e.g. checkout station, self-checkout station) that includes a touchscreen display facing the cashier and another touchscreen display facing the customer, each display includes a touchscreen controller and a camera. Further, each display is coupled over a set of communication interfaces (e.g., USB interface, HDMI interface, VGA interface, Ethernet interface, wireless network interface) to a controller device of the POS system. For instance, each display can have one communication interface (e.g., HDMI interface) associated with displaying images by that display and another communication interface (e.g., USB interface) with the touchscreen controller and the camera of that display. When installing this POS system, an installer may randomly install the communication interfaces for each display with the controller device of the POS system such that the controller device has to be manually configured by the installer to associate those communication interfaces that are specific to each display. Accordingly, techniques and improvements described herein include automatically associating those communication interfaces that are specific to each display of a POS system.

In one exemplary embodiment, a controller device includes a set of communication interfaces (e.g., USB interface/port, HDMI interface/port, VGA interface/port, Ethernet interface/port, wireless network interface/port) that enables the controller device to communicate with another device. Further, the controller device is communicatively coupled over the set of communication interfaces to a set of presence sensitive display devices (e.g., touchscreen displays) with each display device having a presence sensitive display structure (e.g., touchscreen panel) operable to display an image and to enable detection of a presence at a certain location on or about the presence sensitive display structure, an optical sensor device (e.g., camera) operable to detect an image and a presence sensitive controller device (e.g., touchscreen controller) operable to detect a presence (e.g., touch) on or about the display structure. Each optical sensor device has a field of view that includes a region (e.g., surface of a POS system) before a corresponding display device of the set of display devices. Each display device is communicatively coupled to the controller device over at least two communication interfaces of the set of communication interfaces with one communication interface being configured to enable communication associated with the display structure of that display device and another communication interface being configured to enable communication associated with the optical sensor device and the presence sensitive controller device of that display device.

Furthermore, to map or associate a certain display device to a corresponding optical sensor device or presence sensitive controller device, the controller device can send, to a target presence sensitive display device (e.g., touchscreen) over a first communication interface (e.g., HDMI interface) that is associated with a display structure (e.g., touchscreen panel) of the target display device, an indication that includes image data that represents a certain image (e.g., predetermined pattern or color) to enable the display structure of the target display device to illuminate the region (e.g., surface of the POS system) before the target display device with a representation of that image. While the target display device is illuminating the region before the target display device with a representation of the certain image, the controller device can send, to an optical sensor device (e.g., camera) over a second communication interface (e.g., USB interface) that is associated with the optical sensor device of one of the set of presence sensitive display devices, an indication that includes a request to capture an image. In response, the controller device can receive the captured image. Further, the controller device can determine that the captured image includes a representation of the certain image based on the certain image. In response, the controller device can associate that optical sensor device with the target display device. Further, the controller device can associate the corresponding presence sensitive controller device with the target display device.

The exemplary embodiments described herein further include improved techniques to enable mapping optical sensor devices to corresponding display devices. For example, FIG. 1 illustrates one embodiment of a POS system 100 (e.g., checkout station, self-checkout station) associated with a display mapping methodology in accordance with various aspect as described herein. In FIG. 1, the system 100 includes a housing 101 with a surface and a controller device 121 having a set of communication interfaces or ports 123a-d (e.g., USB interface, HDMI interface, VGA interface, DVI interface, Ethernet interface, wireless network interface). Further, the controller device 121 can be communicatively coupled over the set of communication interfaces 123a-d to a set of presence sensitive display devices 103a-b (e.g., touchscreen displays) and a set of optical sensor devices 105a-b (e.g., cameras). Each display device 103a,b can be associated with a presence sensitive controller (e.g., touchscreen controller) or one of the set of optical sensor devices 105a,b, with none, one or both integrated with that display device 103a,b. Further, the communication interfaces 123a-d are not specifically dedicated for each display device 103a,b so that the controller device 121 cannot pre-associate dedicated communication interfaces 123a-d to each display device 103a,b. As mentioned, each optical sensor device 105a,b can correspond to a certain display device 103a,b. For instance, the optical sensor device 105a corresponds to the display device 103a and the optical sensor device 105b corresponds to the display device 103b. Each optical sensor device 105a-b has a field of view that includes a certain region 107a-b before the corresponding display device 103a-b for which that display device 103a,b can illuminate such as based on an image displayed by that display device 103a,b. For instance, the region 107a,b corresponds to the surface of the housing 101 that is illuminated by the corresponding display device 103a,b. As such, the surface that corresponds to the region 107a,b reflects a representation of an image displayed on the corresponding display device 103a,b.

In FIG. 1, in operation, after the display devices 103a-b and optical sensor devices 105a-b are installed in the POS system 100, the controller device 121 can determine to associate which of the set of optical sensor devices 105a-b corresponds to a target display device of the set of display devices 103a-b. The controller device 121 can then select a certain image from a set of images with each image representing a certain pattern or color. The controller device 121 then sends to the target display device of the set of display devices 103a-b an indication that includes the image data that represents the certain image to enable illumination of the region 107a,b with a representation 109 of the certain image. The controller device 121 can then send, to at least one of the set of optical sensor devices 105a-b, an indication that includes a request to capture an image that can include reflected light 111 illuminated from the region 107a-b before the target display device. The controller device 121 can then receive, from the at least one of the set of optical sensor devices 105a-b, an indication that includes the captured image. The controller device 121 can determine that the captured image was received while the target display device 103a,b displays the certain image that is illuminating the region with a representation of that image. Further, the controller device 121 can associate the at least one of the set of optical sensor devices 105a,b with the target display device 103a,b based on the captured image and the certain image.

Figure 2:
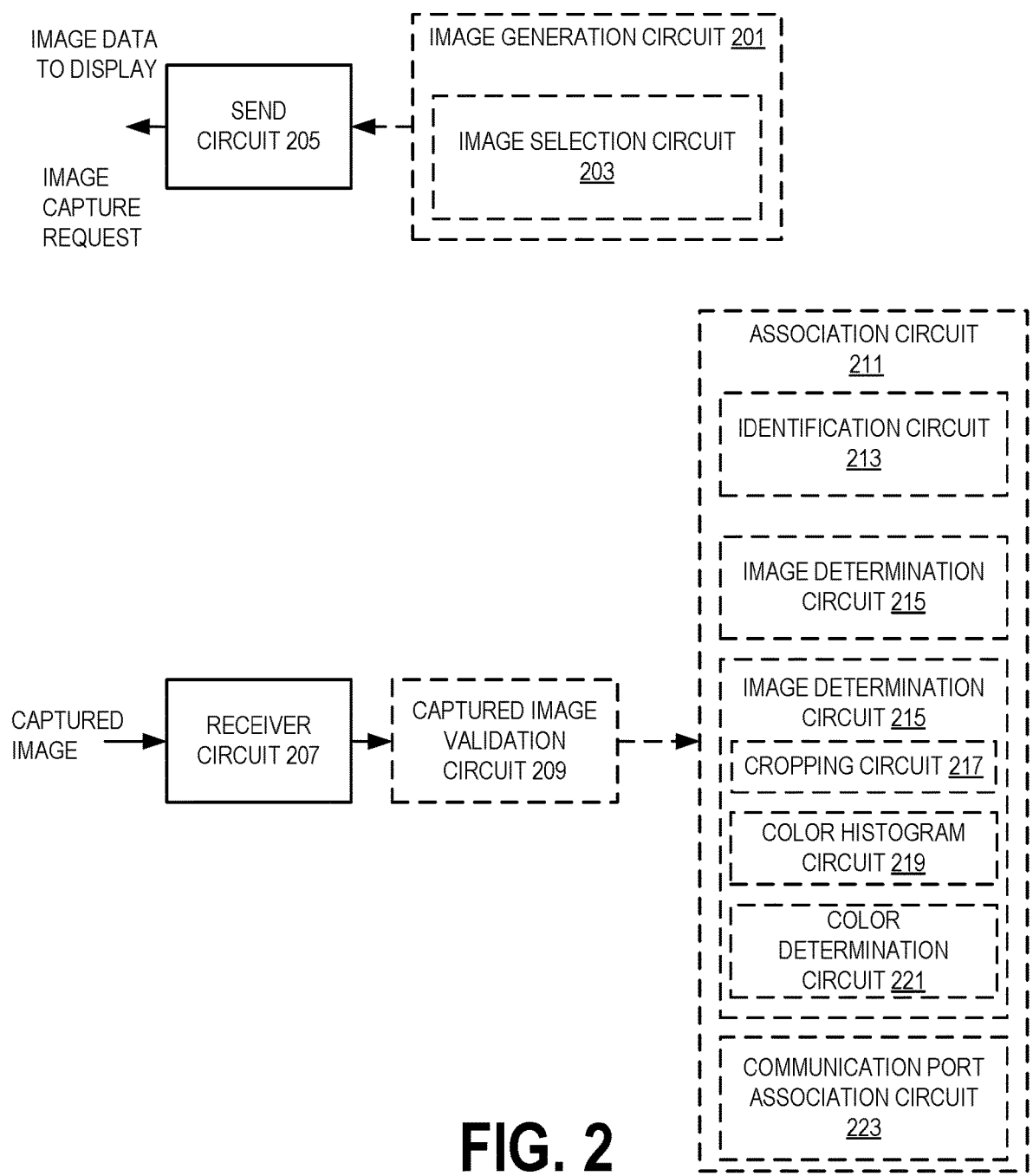
FIG. 2 illustrates one embodiment of a controller device in accordance with various aspects as described herein.

FIG. 2 illustrates one embodiment of a controller device 200 in accordance with various aspects as described herein.

In FIG. 2, the controller device 200 implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: an image generation circuit 201 operable to generate image data that represents a certain image; an image selection circuit 203 operable to select a certain image from a set of images with each image in the set of images having a certain pattern or color; a send circuit 205 operable to send information; a receiver circuit 207 operable to receive information; a captured image validation circuit 209 operable to determine that an image captured by an optical sensor device was received by the controller device 200 while a target display device illuminated a region before the target display device with a representation of a certain image; an association circuit 211 operable to associate an optical sensor device to a target display device based on a certain image and a captured image received by the controller device 200 from an optical sensor device; an identification circuit 213 operable to identify that an optical sensor device corresponds to a target display device based on a certain image and a captured image received by the controller device 200 from an optical sensor device; an image determination circuit 215 operable to determine that a captured image received by the controller device 200 from an optical sensor device includes a representation of a certain image; a cropping circuit 217 operable to crop a captured image received by the controller device 200 from an optical sensor device to include a portion of the captured image associated with the region that is illuminated with the representation of a certain image; a color histogram circuit 219 operable to generate a color histogram based on a captured image; a color determination circuit 221 operable to determine that the captured image corresponds to a certain image based on a color histogram generated based on the captured image; and a communication port association circuit 223 operable to associate a first communication port associated with an optical sensor device to a second communication port associated with a target display device based on an image captured by the optical sensor device and a certain image.

Figure 3:
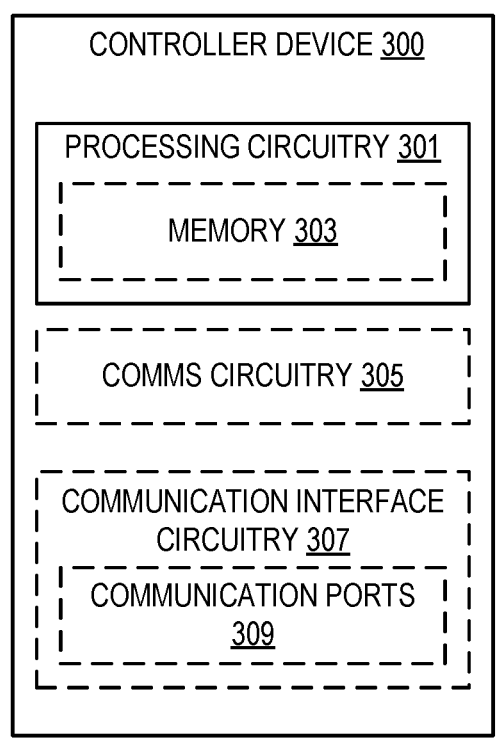
FIG. 3 illustrates another embodiment of a controller device in accordance with various aspects as described herein.

FIG. 3 illustrates one embodiment of a controller device 300 in accordance with various aspects as described herein. As shown, the controller device 300 includes processing circuitry 301 and communication circuitry 305. The communication circuitry 305 is configured to transmit and/or receive information to and/or from one or more other nodes via the communication interface circuitry 307. The processing circuitry 301 is configured to perform processing described above, such as by executing instructions stored in memory 303. The processing circuitry 301 in this regard may implement certain functional means, units, or modules. The communication interface circuitry 307 transmits information, which may be accomplished through a set of communication ports 309, sent by the controller device 300 via the communication circuitry 305 to devices (e.g. display devices and optical sensor devices) that are operationally coupled to the controller device 300, and the communication interface circuitry 307 transmits information, which may be accomplished through a set of communication ports 309, sent to the controller device 300 by devices (e.g. display devices and optical sensor devices) operationally coupled to the controller device 300 so that the controller device 300 may receive such information via the communication circuitry 305.

Figure 4:
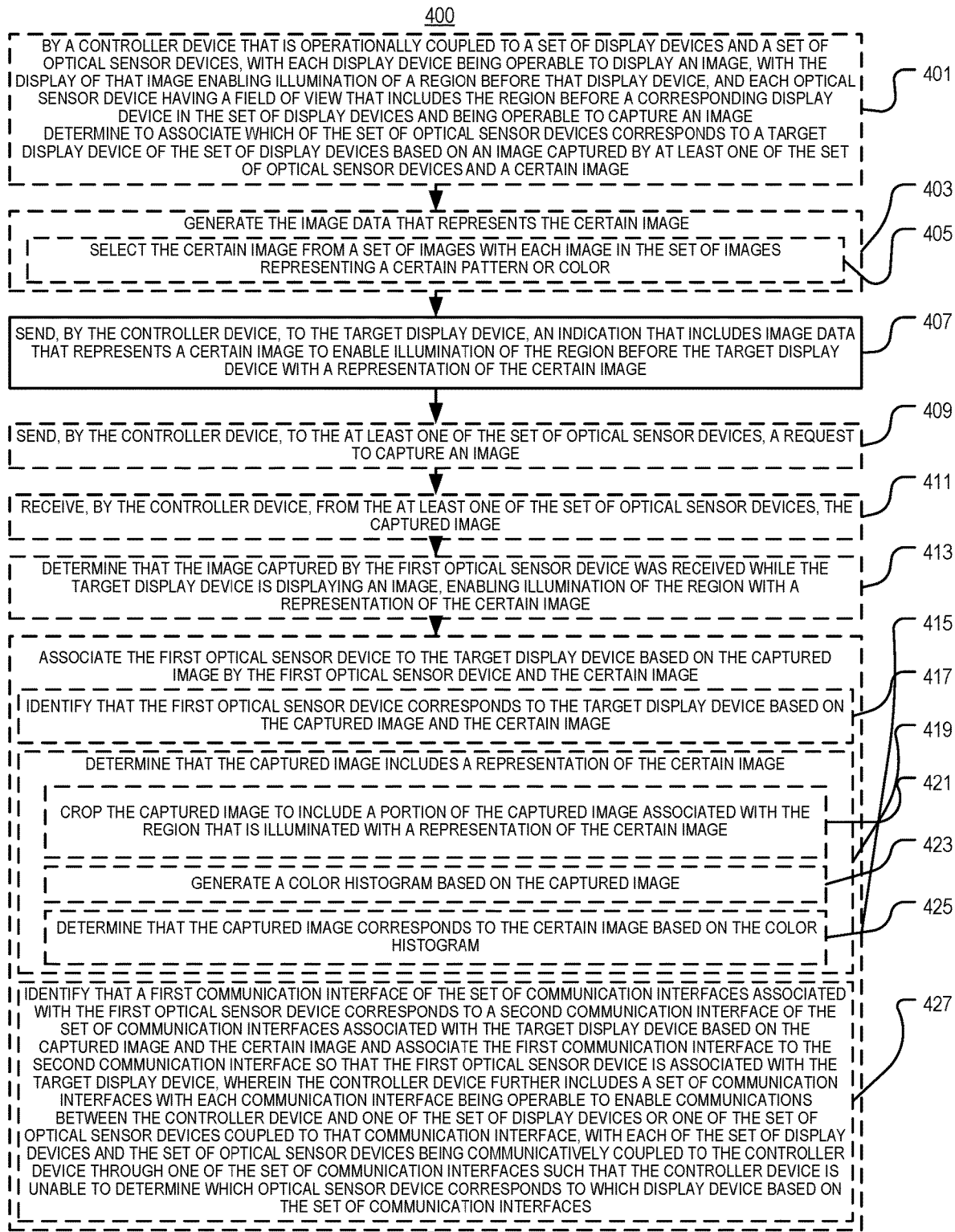
FIG. 4 illustrates one embodiment of a method performed by a controller device of conducting a display mapping methodology in accordance with various aspects as described herein.

FIG. 4 illustrates one embodiment of a method 400 performed by a controller device 121, 200, 300, 500 of conducting a display mapping methodology in accordance with various aspects as described herein. In FIG. 4, the method 400 may start, for instance, at block 401a where it can include determining to associate which of the set of optical sensor devices corresponds to a target display device of the set of display devices. At block 403, the method 400 can include generating image data that represents a certain image configured for display by a display device to enable illumination of a region before that display device with a representation of that image. At block 405, the step of block 403 may include selecting the certain image from a set of images with each image in the set of images representing a certain pattern or color. At block 407, the method 400 includes sending to the target display device an indication that includes image data that represents a certain image to enable illumination of the region before the target display device with a representation of the certain image. At block 409, the method 400 can include sending to the at least one of the set of optical sensor devices, the captured image. At block 411, the method 400 can include receiving from the at least one of the set of optical sensor devices the captured image. At block 413, the method 400 can include determining that the image captured by the first optical sensor device was received while the target display device is displaying an image, enabling illumination of the region with a representation of the certain image. At block 415, the method 400 can include associating the first optical sensor device to the target display device based on the captured image by the first optical sensor device and the certain image. At block 417, the step of block 415 can include identifying that the first optical sensor device corresponds to the target display device based on the captured image and the certain image. At block 419, the step of block 415 can include determining that the captured image includes a representation of the certain image. At block 421, the step of block 419 can include cropping the captured image to include a portion of the captured image associated with the region that is illuminated with the representation of the certain image. At block 423, the step of block 419 can include generating a color histogram based on the captured image. At block 425, the step of block 419 can include determining that the captured image corresponds to the certain image based on the color histogram. At block 427, the step of block 415 can include identifying that a first communication interface of the set of communication interfaces associated with the first optical sensor device corresponds to a second communication interface of the set of communication interfaces associated with the target display device based on the captured image and the certain image and associating the first communication interface to the second communication interface so that the first optical sensor device is associated with the target display device.

Figure 5:
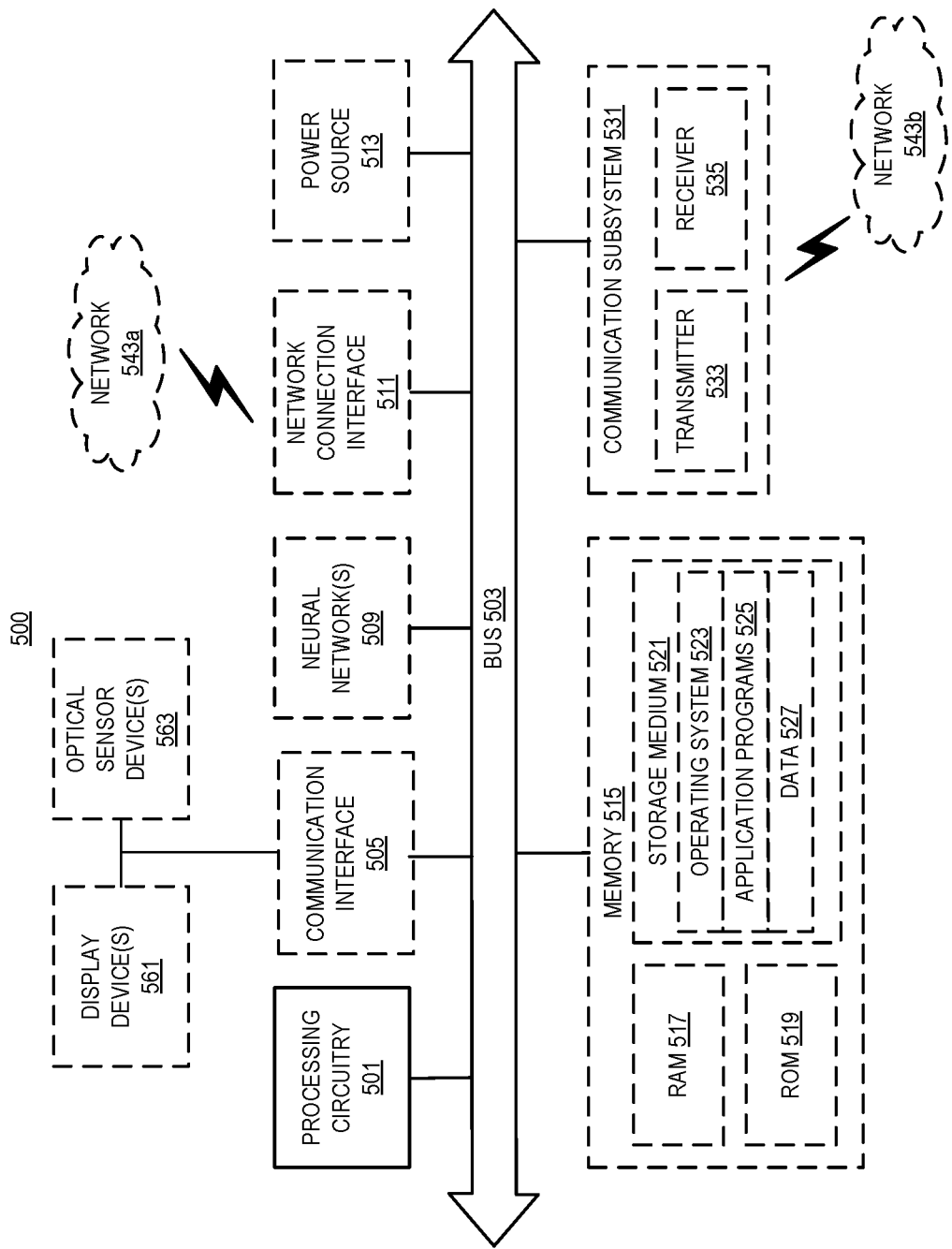
FIG. 5 illustrates another embodiment of a controller device in accordance with various aspects as described herein.

FIG. 5 illustrates another embodiment of a controller device 500 in accordance with various aspects as described herein. In FIG. 5, controller device 500 includes processing circuitry 501 that is operatively coupled to communication interface 505, neural network circuit 509, network connection interface 511, memory 515 including random access memory (RAM) 517, read-only memory (ROM) 519, and storage medium 521 or the like, communication subsystem 531, power source 513, and/or any other component, or any combination thereof.

The communication interface 505 may be configured to provide a communication interface to an input device, output device, or input and output device. The controller device 500 may be configured to use an output device via communication interface 505. An output device may use the same type of interface port as an input device. For example, a USB port may be used to provide input to and output from the controller device 500. The output device may be a speaker, a sound card, a video card, a display, a display device 561, a monitor, a printer, an actuator, an emitter, a smartcard, another output device, or any combination thereof. The controller device 500 may be configured to use an input device via communication interface 505 to allow a user to capture information into the controller device 500. The input device may include a touch-sensitive or presence-sensitive display, a display device 561, an optical sensor device 563 (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection of certain objects in an image. In one example, a first neural network circuit is configured to perform object detection of persons in an image. For example, the neural network circuit 509 may use image data to detect the number of people in a self-checkout queue. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the controller device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the controller device 500.

The features, benefits and/or functions described herein may be implemented in one of the components of the controller device 500 or partitioned across multiple components of the device controller 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a controller device that is operationally coupled to a set of display devices and a set of optical sensor devices, with each display device being operable to display an image, with the display of that image enabling illumination of a region before that display device. Each optical sensor device has a field of view that includes the region before a corresponding display device of the set of display devices and is operable to capture an image. The method includes sending, to a target display device of the set of display devices, an indication that includes image data that represents a certain image to enable illumination of the region before the target display device with a representation of the certain image so that the controller device is operable to associate which of the set of optical sensor devices corresponds to the target display device based on the image captured by at least one of the set of optical sensor devices and the certain image.

In another exemplary embodiment, the method further includes associating a first optical sensor device of the set of optical sensor devices to the target display device based on the captured image by the first optical sensor device and the certain image.

In another exemplary embodiment, the method further includes identifying that the first optical sensor device corresponds to the target display device based on the captured image and the certain image.

In another exemplary embodiment, the method further includes determining that the captured image includes a representation of the certain image.

In another exemplary embodiment, the method further includes cropping the captured image to include a portion of the captured image associated with the region that is illuminated with the representation of the certain image.

In another exemplary embodiment, the method further includes generating a color histogram based on the captured image and determining that the captured image corresponds to the certain image based on the color histogram.

In another exemplary embodiment, the method further includes generating the image data that represents the certain image.

In another exemplary embodiment, the method further includes selecting the certain image from a set of images with each image in the set of images having a certain pattern or color.

In another exemplary embodiment, the method further includes sending, by the controller device, to the at least one of the set of optical sensor devices, a request to capture an image and receiving, from the at least one of the set of optical sensor devices, the captured image.

In another exemplary embodiment, the method further includes determining that the image captured by the first optical sensor device was received while the target display device is displaying an image, enabling illumination of the region with a representation of the certain image.

In another exemplary embodiment, the method is further defined by having the controller device include a set of communication interfaces with each interface being operable to enable communications between the controller device and one of the set of display devices or one of the set of optical sensor devices coupled to that interface, with each of the set of display devices and the set of optical sensor devices being communicatively coupled to the controller device through one of the set of communication interfaces such that the controller device is unable to determine which optical sensor device corresponds to which display device based on the set of communication interfaces. The method further includes identifying that a first communication interface of the set of communication interfaces associated with the first optical sensor device corresponds to a second communication interface of the set of communication interfaces associated with the target display device based on the captured image and the certain image.

The method further includes associating the first communication port to the second communication port so that the first optical sensor device is associated with the target display device.

In one exemplary embodiment, a controller device comprises a controller device operationally coupled to a set of display devices and a set of optical sensor devices, with each display device being operable to display an image, with the display of that image enabling illumination of a region before that display device, and each optical sensor device having a field of view that includes the region before a corresponding display device of the set of display devices and being operable to capture an image. The controller device further comprises a processor and a memory, with the memory containing instructions executable by the processor whereby the processor is configured to send, to a target display device of the set of display devices, an indication that includes image data that represents a certain image to enable illumination of the region before the target display device with a representation of the certain image so that the controller device is operable to associate which of the set of optical sensor devices corresponds to the target display device based on the image captured by at least one of the set of optical sensor devices and the certain image.

In another exemplary embodiment, the memory of the controller device contains further instructions executable by the processor whereby the processor is further configured to associate a first optical sensor device of the set of optical sensor devices to the target display device based on the captured image by the first optical sensor device and the certain image.

In another exemplary embodiment, the memory of the controller device contains further instructions executable by the processor whereby the processor is further configured to identify that the first optical sensor device corresponds to the target display device based on the captured image and the certain image.

In another exemplary embodiment, the memory of the controller device contains further instructions executable by the processor whereby the processor is further configured to determine that the captured image includes a representation of the certain image.

In another exemplary embodiment, the memory of the controller device contains further instructions executable by the processor whereby the processor is further configured to crop the captured image to include a portion of the captured image associated with the region that is illuminated with the representation of the certain image.

In another exemplary embodiment, the memory of the controller device contains further instructions executable by the processor whereby the processor is further configured to generate a color histogram based on the captured image and determine that the captured image corresponds to the certain image based on the color histogram.

In another exemplary embodiment, the memory of the controller device contains further instructions executable by the processor whereby the processor is further configured to generate the image data that represents the certain image.

In another exemplary embodiment, the memory of the controller device contains further instructions executable by the processor whereby the processor is further configured to select the certain image from a set of images with each image in the set of images having a certain pattern or color.

In another exemplary embodiment, the memory of the controller device contains further instructions executable by the processor whereby the processor is further configured to send, by the controller device, to the at least one of the set of optical sensor devices, a request to capture an image and receive, from the at least one of the set of optical sensor devices, the captured image.

In another exemplary embodiment, the memory of the controller device contains further instructions executable by the processor whereby the processor is further configured to determine that the image captured by the first optical sensor device was received while the target display device is displaying an image, enabling illumination of the region with a representation of the certain image.

In another exemplary embodiment, the controller device further includes a set of communication interfaces with each interface being operable to enable communications between the controller device and one of the set of display devices or one of the set of optical sensor devices coupled to that interface, with each of the set of display devices and the set of optical sensor devices being communicatively coupled to the controller device through one of the set of communication interfaces such that the controller device is unable to determine which optical sensor device corresponds to which display device based on the set of communication interfaces. The memory of the controller device also contains further instructions executable by the processor whereby the processor is further configured to identify that a first communication interface of the set of communication interfaces associated with the first optical sensor device corresponds to a second communication interface of the set of communication interfaces associated with the target display device based on the captured image and the certain image and associate the first communication port to the second communication port so that the first optical sensor device is associated with the target display device.

In one exemplary embodiment, a system comprises a set of display devices with each display device being operable to display an image, with the display of that image enabling illumination of a region before that display device, and a set of optical sensor devices, with each optical sensor device being operable to capture an image and having field of view that includes the region before a corresponding display device of the set of display devices. The system further comprises a controller device operationally coupled to each display device and optical sensor device; wherein the controller device is operable to send to a target display device of the set of display devices, an indication that includes image data that represents a certain image to enable illumination of the region before the target display device with a representation of that image so that the controller device is operable to associate which of the set of optical sensor devices corresponds to the target display device based on the image captured by at least one of the set of optical sensor devices and the certain image.

In one exemplary embodiment, a method is performed by a controller device having a set of communication interfaces. Further, the controller device is communicatively coupled over the set of communication interfaces to a set of display devices with each display device having a display structure operable to display an image, an optical sensor device operable to detect an image and a presence sensitive controller device operable to detect a presence about the display structure. Each optical sensor device has a field of view that includes the region before a corresponding display device of the set of display devices. Also, each display device is communicatively coupled to the controller device over at least two communication interfaces of the set of communication interfaces with one communication interface configured to enable communications associated with the display structure of that display device and another communication interface configured to enable communication associated with the optical sensor device and the presence sensitive controller device of that display device. The method includes sending, to a target display device of the set of display devices over a first communication interface of the set of communication interfaces that is associated with the display structure of the target display device, an indication that includes image data that represents a certain image to enable the display structure of the target display device to illuminate a region before the target display device with a representation of that image so that the controller device is operable to determine which communication interface of the set of communication interfaces corresponds to the communication interface associated with the optical sensor device and the presence sensitive controller device of target display device.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a controller device that is operationally coupled to a set of display devices and a set of optical sensor devices, with each display device being operable to display an image, with the display of that image enabling illumination of a region before that display device, and each optical sensor device having a field of view that includes the region before a corresponding display device of the set of display devices and being operable to capture an image, sending, to a target display device of the set of display devices, an indication that includes image data that represents a certain image to enable illumination of the region before the target display device with a representation of that image;
generating a color histogram based on an image captured by at least one of the set of optical sensor devices; and
determining that the captured image corresponds to the certain image based on the color histogram so that the controller device is operable to associate which of the set of optical sensor devices corresponds to the target display device based on the image captured by at least one of the set of optical sensor devices and the certain image.

2. The method of claim 1, further comprising:
associating a first optical sensor device of the set of optical sensor devices to the target display device based on the captured image by the first optical sensor device and the certain image.

3. The method of claim 2, further comprising:
identifying that the first optical sensor device corresponds to the target display device based on the captured image and the certain image.

4. The method of claim 2, further comprising:
determining that the captured image includes a representation of the certain image.

5. The method of claim 4, further comprising:
cropping the captured image to include a portion of the captured image associated with the region that is illuminated with the representation of the certain image.

6. The method of claim 1, further comprising:
generating the image data that represents the certain image.

7. The method of claim 6, further comprising:
selecting the certain image from a set of images with each image having a certain pattern or color.

8. The method of claim 1, further comprising:
sending, by the controller device, to the at least one of the set of optical sensor devices, a request to capture an image; and
receiving, from the at least one of the set of optical sensor devices, the captured image.

9. The method of claim 8, further comprising:
determining that the image captured by the first optical sensor device was received while the target display device is displaying an image, enabling illumination of the region with a representation of the certain image.

10. The method of claim 1, wherein the controller device further includes a set of communication interfaces with each interface being operable to enable communications between the controller device and one of the set of display devices or one of the set of optical sensor devices coupled to that interface, with each of the set of display devices and the set of optical sensor devices being communicatively coupled to the controller device through one of the set of communication interfaces such that the controller device is unable to determine which optical sensor device corresponds to which display device based on the set of communication interfaces;
wherein the method further comprising:
identifying that a first communication interface of the set of communication interfaces associated with the first optical sensor device corresponds to a second communication interface of the set of communication interfaces associated with the target display device based on the captured image and the certain image; and
associating the first communication interface to the second communication interface so that the first optical sensor device is associated with the target display device.

11. A controller device, comprising:
wherein the controller device is operationally coupled to a set of display devices and a set of optical sensor devices, with each display device being operable to display an image, with the display of that image enabling illumination of a region before that display device, and each optical sensor device having a field of view that includes the region before a corresponding display device of the set of display devices and being operable to capture an image
wherein the controller device further comprises a processor and a memory, the memory containing instructions executable by the processor whereby the processor is configured to:
send, to a target display device of the set of display devices, an indication that includes image data that represents a certain image to enable illumination of the region before the target display device with a representation of the certain image;
generate a color histogram based on an image captured by at least one of the set of optical sensor devices; and
determine that the captured image corresponds to the certain image based on the color histogram so that the controller device is operable to associate which of the set of optical sensor devices corresponds to the target display device based on the image captured by at least one of the set of optical sensor devices and the certain image.

12. The controller device of claim 11, wherein the memory contains instructions executable by the processor whereby the processor is further configured to:
associate a first optical sensor device of the set of optical sensor devices to the target display device based on the captured image by the first optical sensor device and the certain image.

13. The controller device of claim 11, wherein the memory contains instructions executable by the processor whereby the processor is further configured to:
identify that a first optical sensor device corresponds to the target display device based on the captured image and the certain image.

14. The controller device of claim 11, wherein the memory contains instructions executable by the processor whereby the processor is further configured to:
determine that the captured image includes a representation of the certain image.

15. The device of claim 11, wherein the memory contains instructions executable by the processor whereby the processor is further configured to:
generate the image data that represents the certain image.

16. The device of claim 11, wherein the memory contains instructions executable by the processor whereby the processor is further configured to:
select the certain image from a set of images with each image having a certain pattern or color.

17. The device of claim 11, wherein the memory contains instructions executable by the processor whereby the processor is further configured to:
send, by the controller device, to the at least one of the set of optical sensor devices, a request to capture an image; and
receive, from the at least one of the set of optical sensor devices, the captured image.

18. A system, comprising:
a set of display devices with each display device being operable to display an image and with the display of that image enabling illumination of a region before that display device;
a set of optical sensor devices with each optical sensor device being operable to capture an image and having a field of view that includes the region before a corresponding display device of the set of display devices; and
a controller device operationally coupled to the set of display devices and the set of optical sensor devices, with the controller device being operable to:
send, to a target display device of the set of display devices, an indication that includes image data that represents a certain image to enable illumination of the region before the target display device with a representation of that image;
generate a color histogram based on an image captured by at least one of the set of optical sensor devices; and
determine that the captured image corresponds to the certain image based on the color histogram so that the controller device is operable to associate which of the set of optical sensor devices corresponds to the target display device based on the image captured by at least one of the set of optical sensor devices and the certain image.

* * * * *